(12) United States Patent
O'Callaghan et al.

(10) Patent No.: US 7,701,941 B2
(45) Date of Patent: Apr. 20, 2010

(54) NETWORK SWITCH WITH MUTUALLY COUPLED LOOK-UP ENGINE AND NETWORK PROCESSOR

(75) Inventors: Sorcha O'Callaghan, Cobh (IE); Neil O Fanning, Kilworth (IE); Kevin Jennings, Dublin (IE); Eugene O'Neill, Dublin (IE); Joseph N Butler, Galway (IE)

(73) Assignee: 3Com Corporation, Marlborough, MA (US)

( * ) Notice: Subject to any disclaimer, the term of this patent is extended or adjusted under 35 U.S.C. 154(b) by 774 days.

(21) Appl. No.: 09/818,670

(22) Filed: Mar. 28, 2001

(65) Prior Publication Data

US 2002/0101867 A1    Aug. 1, 2002

(30) Foreign Application Priority Data

Jan. 30, 2001  (GB) ................................. 0102310.0

(51) Int. Cl.
*H04L 12/28* (2006.01)
(52) U.S. Cl. .................. 370/392; 370/389; 370/390; 370/395.54; 370/471; 370/474
(58) Field of Classification Search .............. 370/386, 370/389, 392, 395.5, 401–402, 412, 422, 370/423, 428, 429, 466, 471, 474, 475, 395.53, 370/388, 390, 395.54, 395.31, 395.32; 709/203, 709/226, 231, 236, 238, 243, 250
See application file for complete search history.

(56) References Cited

U.S. PATENT DOCUMENTS

| | | | |
|---|---|---|---|
| 5,917,819 A * | 6/1999 | Yang et al. ................... 370/390 |
| 5,938,736 A | 8/1999 | Muller et al. | |
| 6,041,053 A | 3/2000 | Douceur et al. | |
| 6,128,666 A * | 10/2000 | Muller et al. ................ 709/238 |
| 6,181,699 B1 * | 1/2001 | Crinion et al. ............... 370/392 |
| 6,335,935 B2 * | 1/2002 | Kadambi et al. ............. 370/396 |
| 6,438,129 B1 * | 8/2002 | Jennings et al. ............. 370/392 |
| 6,580,712 B1 * | 6/2003 | Jennings et al. ............. 370/392 |
| 6,731,644 B1 * | 5/2004 | Epps et al. ................... 370/412 |
| 6,807,175 B1 * | 10/2004 | Jennings et al. ............. 370/390 |
| 6,836,481 B1 * | 12/2004 | Hotta .......................... 370/392 |
| 6,940,856 B2 * | 9/2005 | Vu .............................. 370/390 |
| 7,031,308 B2 * | 4/2006 | Garcia-Luna-Aceves et al. .......................... 370/390 |
| 7,079,501 B2 * | 7/2006 | Boivie ........................ 370/312 |
| 7,103,043 B2 * | 9/2006 | Kurokawa et al. .......... 370/390 |
| 7,286,497 B2 * | 10/2007 | Bernheim et al. ........ 370/310.2 |
| 7,362,750 B2 * | 4/2008 | Choi et al. ................... 370/369 |
| 7,430,208 B1 * | 9/2008 | Patra et al. ................ 370/395.1 |
| 7,480,300 B2 * | 1/2009 | O'Keeffe et al. ............ 370/392 |
| 2002/0018489 A1 * | 2/2002 | Ambe et al. ................. 370/475 |

(Continued)

FOREIGN PATENT DOCUMENTS

EP         0551243 A2      7/1993

(Continued)

*Primary Examiner*—Pankaj Kumar
*Assistant Examiner*—Mark A Mais (57) ABSTRACT

A network switch includes a look-up engine for obtaining associated data in response to a header portion of a packet and an interlinked network processor such as a RISC for performing a processing function on the header portion or the associated data. Both look-up engine and the network processor may modify a destination port bitmask. The network processor may implement additional packet header processing required for replication or server load balancing.

9 Claims, 12 Drawing Sheets

U.S. PATENT DOCUMENTS

2003/0058864 A1 * 3/2003 Michels et al. .............. 370/392

FOREIGN PATENT DOCUMENTS

| | | | |
|---|---|---|---|
| GB | 2317475 A | 5/1996 |
| GB | 2317542 A | 5/1996 |
| GB | 2337674 A | 11/1999 |
| JP | 2000-244574 | 9/2000 |

* cited by examiner

| Word | Layer 2 AD<br>Layer 3 Unicast/Browser AD | | |
|---|---|---|---|
| 0 | MAC address [47:32] | MAC address [31:16] | |
| 1 | MAC address [15:0] | Control word [15:0] | |
| 2 | Unused [31:17] | HNAT Direction [17:16] | Control word2 [ 15:0] |
| 3 | New IP Address [31:0] | | |
| 4 | Port Bitmask [31:0] | | |

FIG. 5A

| Word1<br>Bit | Layer 2 AD<br>Layer 3 Unicast/Broadcast AD | Layer 3 Multicast AD |
|---|---|---|
|  |  |  |
| 15 | SendToPVID | SendToPVID |
| 14 | ForwardAlways | ForwardAlways |
| 13 | BridgeOnly | BridgeAlways |
| 12:8 | PortID[4:0] | PortID[4:0] |
| 7 | MDS | MDS |
| 6 | NoMisMatch | Unused |
| 5:4 | Age[1:0] | Unused |
| 3:0 | Box Bitmask[3:0] | Box Bitmask[3:0] |
|  |  |  |

FIG. 5B

| Word2 Bit | Layer 2 AD Layer 3 Unicast/Broadcast AD | Layer 3 Multicast AD |
|---|---|---|
|  |  |  |
| 15:7 | ReplicationPtr[8:0] | ReplicationPtr[8:0] |
| 6:5 | CpuPriority[1:0] | CpuPriority[1:0] |
| 4:0 | VlanID[4:0] | VlanID[4:0] |
|  |  |  |

NETWORK SWITCH WITH MUTUALLY COUPLED LOOK-UP ENGINE AND NETWORK PROCESSOR

FIELD OF THE INVENTION

This invention relates to network switches for use in packet-based data communication systems and particularly to network switches which include means for modifying the header of a packet while a look-up is being performed, particularly to facilitate a replication process or to facilitate server load balancing.

BACKGROUND TO THE INVENTION

Packet-based communication systems such as those based on Ethernet standards and others include switches, which can be both hardware and software based, but usually are a mixture of hardware and software processing, and which may perform switching based on either 'layer 2' (media access control) addresses or 'layer 3' (network or IP addresses) or both. One example of a network switch which is hardware based and can perform switching on the basis of both layer 2 and layer 3 addresses is described in GB patent 2337674.

In physical terms, network switches may take a variety of forms. A specific example described herein comprises a modular form wherein the modules are each constituted by an application-specific-integrated circuit coupled to respective ports and each having interfaces for high speed multiple bit parallel links between the modules. However, although implementation of switches as application-specific-integrated circuits containing most of the processing blocks and at least some of the memory required to provide storage of packets is now commonplace, the invention is not intended to be limited to any specific physical implementation.

Whatever may be the specific physical realization, network switches of this general kind typically perform the same basic switching process. They include a database, sometimes called a forwarding database or look-up database, which is accessed in response to address data (typically a destination address in the header of a packet) in order to retrieve 'associated' or 'forwarding' data which identifies for any given packet the port or ports to which the packet (or a copy thereof) is to be forwarded. For this purpose it is customary when the packet is received to place it in temporary storage (such as a FIFO defined in some respective memory space) while the header including the address data of the packet is subjected to the look-up process.

Look-up databases can be organised in a variety of different ways. Some databases employ hashing on address data or selected parts of it to provide access to entries which include pointers to the respective associated data. If hashing is employed then it is necessary to compare an identified entry with the original address data to ensure that there is a match. Methods exist for providing linked lists in hash controlled look-up databases to cope with the phenomenon that different addresses may hash to the same word value. Other forms of look-up database include a trie database which operates on segments of a key (consisting of all or part of the address data of the packet) and at each stage of the search there is a pointer to a block of entries which are distinguished by the next section of the key and so on. At any stage of the trie search the search may terminate with a pointer to the required associated data. Trie searches are fully described in European patent application No. EP-0551243-A2, U.S. Pat. No. 6,041,053 and more recently in GB patent application No. 0026264 2. Other forms of database employ binary tree searching or combinations of different search facilities, such as for example a cache memory for frequently occurring addresses as well as a trie search facility, as described in GB patent application No. 0025507 5.

Whatever the specific form of look-up, the search will normally produce forwarding data, typically in the form of a port bitmask wherein each for each bit that is set in the bitmask the relevant port must receive a copy of the packet. The search may use either the 'layer 2' (media access control) or 'layer 3' (network protocol) information in the packet and may also use VLAN identification information. Normally, in addition to the address and other information employed for the look-up, the look-up engine is provided with a status word may indicate the result of some processing done on the packet before it arrives at the look-up engine. The look-up engine may modify the status word to provide information to the transmit side, that is to say that part of the switch which is responsible for forwarding a packet from the 'transmit' port or ports. The status word may be modified so as, for example, to flag a change to the media access control destination address, to cause re-calculation of the check sum or cyclic redundancy code and so on. After the search is performed the look-up engine may drive the bitmask through what is termed 'post-processing logic'. This is provided in modern switches in order to cope with the complexity of trunking (wherein a switch or a stack of switches is connected to another switch or stack of switches by means of a multiplicity of links) special rules relating to cascade connections, namely the means of conveying packets from one unit to another in a stack of units managed as a single entity, various discarding rules and so on. The result of post processing is to produce a modified version of the port bitmask which is then passed on to a control, usually called a receive link table, which controls the passage of the packet to the required destination port or ports after a check is made that there are no other links from a source port in the switch to the required destination port. A receive link table may set up several links from the different source ports simultaneously.

At a 'transmit' side of the switch, a packet may again be written into a FIFO store. When the packet reaches its turn for reading out, the status word is examined and any port of which a bit is set in the destination port bitmask must receive a copy of the packet.

SUMMARY OF THE INVENTION

The present invention has a general object of improving the efficiency and speed of network switching by allowing parallel processing of a packet header and in particular to provide a network processor which, while a look-up engine is in operation on a particular packet, can examine a packet header and determine whether intervention in the look-up and/or post-processing process is appropriate or necessary.

The present invention can be used to implement such functions as half-network address translation and packet replication in a convenient and rapid way.

A further benefit of the scheme is that by separating the look-up process and other actions which may be taken by the network processor, so that the network processor can modify the packet header or status word in addition to the actions of the look-up engine, it is feasible to include new functions or processing that do not exist currently but may need to be introduced in future. Such additions can be made without re-design of the ASIC but merely by providing a new version for the software which controls the network processor.

In a typical example of the invention, a network processor waits, in respect of a particular packet, for an indication that a packet header is loaded into respective registers. At the same time the look-up engine commences a search based on information in the packet header. In parallel with the search the network processor can examine the packet header and determine whether it needs to intervene to implement a selected function. It can also wait until the search has finished and it may then read the associated data obtained from the search and make further decisions based on that associated data. In either case the look-up engine stops once it has finished a search, for example having found an associated data block containing a port bitmask and fields it needs to modify in the status word. Once the search has finished the look-up engine may set a flag to indicate to the network processor that the processor may start to read and/or modify the port bitmask and the status word. The network processor can in this scheme modify any part of the header that may be necessary. A new bitmask can be written into any stage of the post processing logic. In turn this means that the network processor may still employ logic existing in the look-up engine to perform a complex trunking algorithm but it may also for example add a new port to the bitmask. Alternatively the network processor may implement a new trunking algorithm and read the bitmask before that enters the trunking logic and writes the resultant bitmask in after the trunking stage in the look-up engine. The network processor might also modify the status word and therefore provide therein an indication to a transmit circuit to re-calculate a CRC at that stage, which may be more efficiently performed on the transmit side rather than in the network processor. When the network processor has finished making its modifications to the packet it may set a flag indicating a finished task to the look-up engine. The look-up engine may then in turn operate to pass on the modified port bitmask and status word. Then both the network processor and the look-up engine can wait for the receive circuitry to indicate that the next packet header is written into memory.

One particular example of improved working according to the present invention arises when it is necessary to replicate the packet in order that the same packet be sent out of a single port onto a variety of VLANs. This is needed in many cases where a multiplicity of VLANs are attached to the same port, as for example in IP multicasting.

An existing solution to the problem is to send the packet off to a dedicated management port where an interrupt is generated. A special software routine then runs to determine the VLANs on which the packet needs to be sent. The packet is then retransmitted from the management port to the receive side of the port as many times as necessary. This is a slow process which can be accelerated according to the invention.

In this aspect of the invention, the first time the packet is being subject to look-up, the network processor may examine the packet in parallel with the look-up process. Based on information provided by the look-up engine the network processor may determine whether the packet needs to be replicated and if so, the network processor may overwrite a VLAN field in the packet header and instruct the receive side to retransmit the packet as many times as necessary. In any event the network processor will ensure that the look-up machine does not start processing of the next packet until the replication process is complete.

The process known as server load balancing may also be improved according to the present invention.

Other features of the invention will become apparent from the following description with reference to the accompanying drawings.

DETAILED DESCRIPTION

Figure 1:
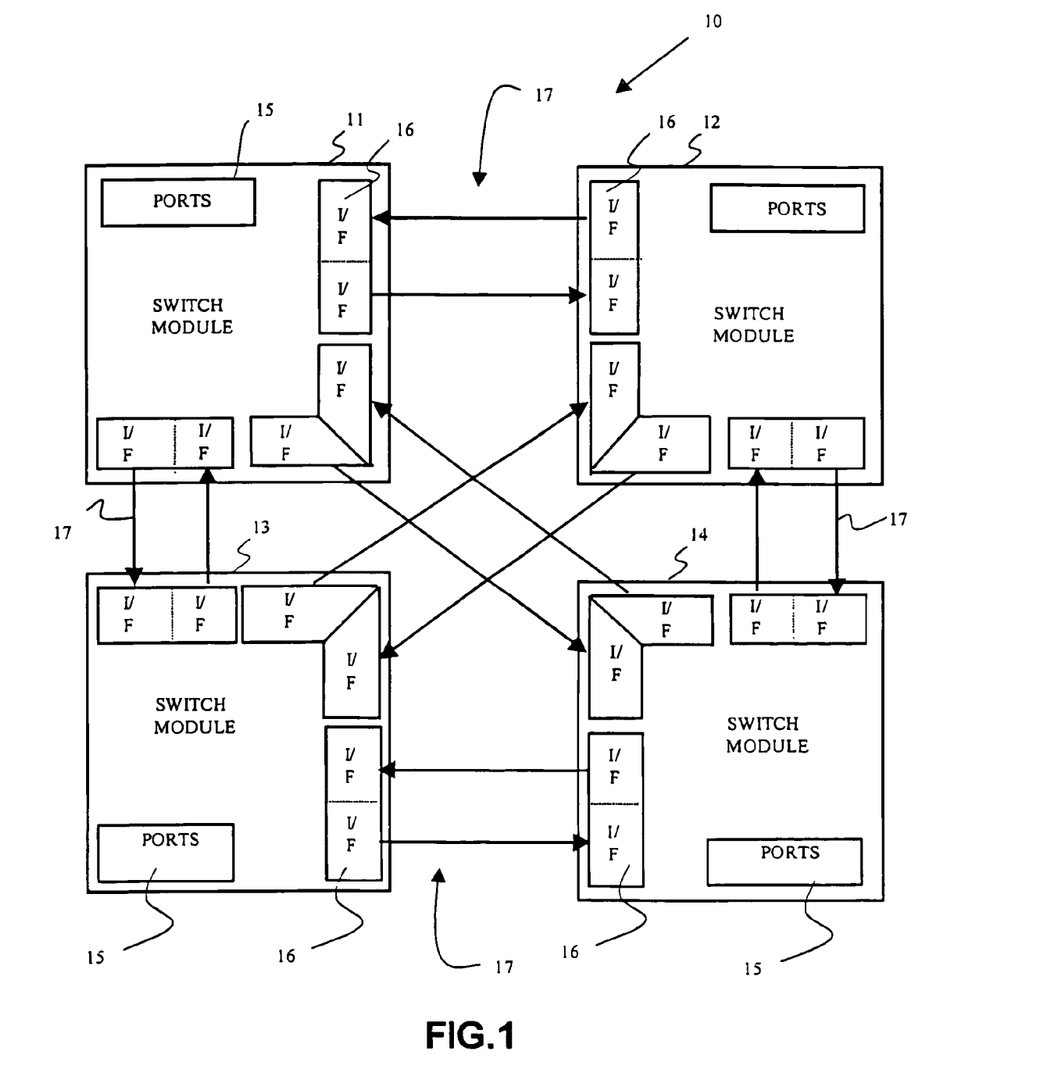
FIG. 1 is a simplified representation of a multi-chip network switch.
Figure 2:
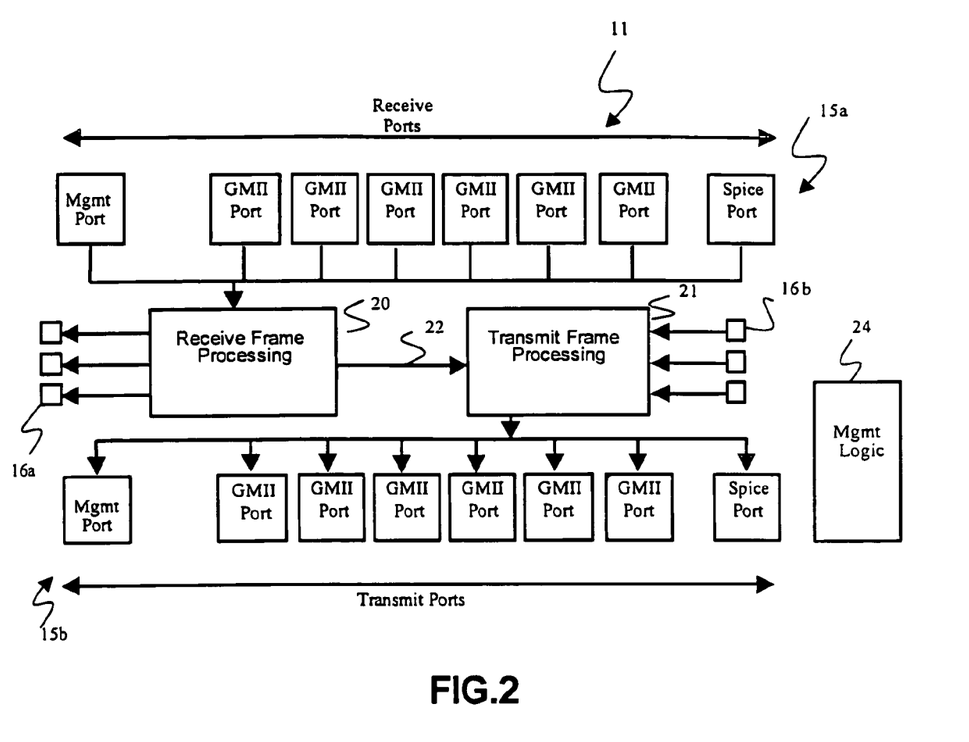
FIG. 2 is a schematic illustration of the switch represented by one of the switch modules in FIG. 1.

FIG. 1 of the drawings is a schematic representation of a network switch 10 which is composed of, in this example, four switch modules 11, 12, 13 and 14 each constituted by an application specific integrated circuit of which the principal components are shown in FIG. 2. For each of the switch modules there is a set of respective external ports 15, and a set of interfaces 16 which communicate with interfaces on the other modules by way of high-speed links 17, each link typically consisting of eight parallel data lines and a control line, as described for example in GB patent application Nos. 2454369 and 2454370. This physical architecture is given only by way of example.

Figure 3:
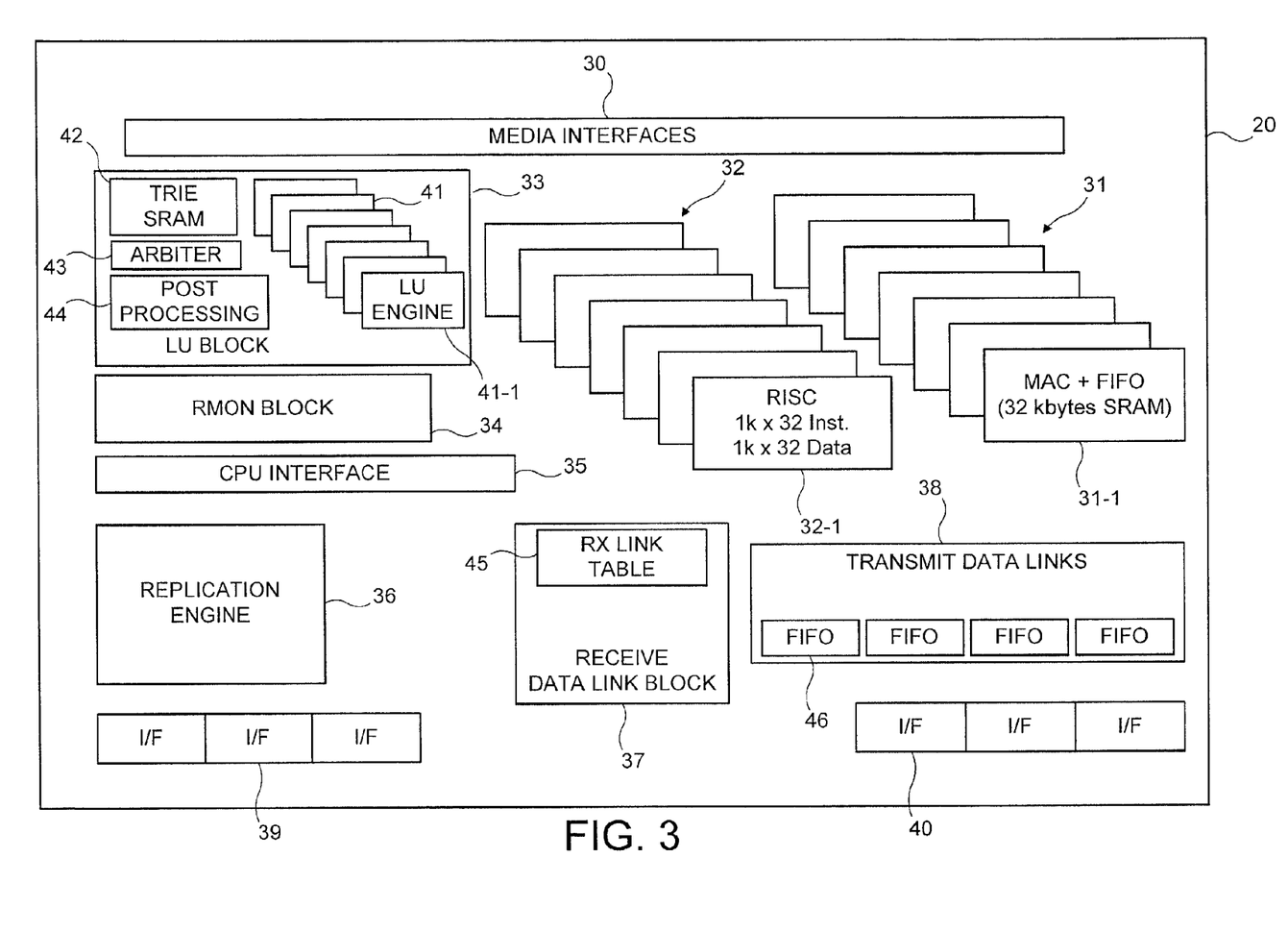
FIG. 3 is a more detailed schematic diagram illustrating the various processing blocks of the receive side of a switch as shown in FIGS. 1 and 2.

The general layout of the switch as shown in FIGS. 1 to 3 resembles a switch available from 3Com Corporation, Santa Clara, Calif. under the description 'Superstack 3 Switch 4900'.

FIG. 2 illustrates the general organisation of one of the switch modules (11) as shown in FIG. 1 The ports 15 comprise receive ports 15a and transmit ports 15b. The receive ports 15a comprise a plurality of GMII (Gigabit Media Independent Interface) ports, a management port and a 'spice' port and the transmit ports likewise comprise a management port, GMII ports and a 'spice' port. In accordance with ordinary practice, the management port is primarily used for the reception and forwarding of 'management' frames employed for control and configuration of the switch. The GMII ports are provided for the reception and forwarding of packets or data frames to and from the switch.

Frames or packets received by the receive ports are coupled to a receive frame processing block 20, as further described in FIG. 3. Frames which have been processed by the receive frame processing block 20 and are intended for dispatch by any of the transmit ports 15b in the same module are coupled to a transmit frame processing block 21, for example by means of an internal high-speed bus 22. Frames which have been processed by the receive frame processing block 20 and are intended for dispatch by, for example, ports on a different module are driven out on the respective interface 16a to be transmitted by way of high speed links 17 (as shown in FIG. 1) to one or other of the other three modules. Likewise, packets received at any of the other three modules and intended for dispatch by any of the transmit ports 15*b* in module 11 are received by the transmit frame processing block 21 by way of the interfaces 16*b*.

Receive frame processing block 20 is organised, as described with reference to FIG. 3, to perform look-ups on address data, usually including destination addresses on frames and also to perform other forms of processing generally termed post-processing, wherein a status word and other data including a destination port mask may be further modified before the associated data and a frame are driven on the bus 22 or by way of the interfaces 16*a* to the transmit frame processing block 21 on the same module or chip or to the corresponding processing block on another chip.

The organisation of the transmit frame processing block 21 is not directly relevant to the present invention but its general organisation and function will become apparent from the description of the receive frame processing. In essence it comprises a multiplicity of FIFOs defined in an associated memory space, and queue arbiters of which the function is to receive requests from the various links for access to a particular queue and decide on who should next write into the queue. The function of the transmit frame processing block is also to drive out packets from the FIFOs to the respective ports thereby performing the forwarding function required of the switch.

Merely for the sake of completeness the module shown in FIG. 2 includes a management logic block 24. The management circuits form no part of the present invention and will not be further described.

FIG. 3 indicates the organisation of the receive frame processing block 20 previously mentioned with reference to FIG. 2. Except for the close coupling of the network processors and the look-up engines and the consequences which are enabled by that coupling, the general layout of the switch is in accordance with the current state of the art and particularly the commercially available switch previously mentioned. Switch module 20 is intended to be mainly hardware based except that the network processes to be described are software programmable for reasons which will become apparent.

Switch module 20 includes interfaces 30 for coupling frames received by ports 15*a* to receive circuits 31 of which there is one for each port and each, as shown for receive circuit 31-1, comprises a media access controller (MAC) in known form and a receive FIFO, typically constituted by 32 kilobytes of static random access memory (SRAM). Associated with each receive circuit 31 is a network processor constituted by a Reduced Instruction Set Computer (RISC) each of which may hold 1K×32 bit instruction words and 1 k×32 bit data words. Module 20 also includes a look-up block 33, to be described in more detail later. An RMON block 34 in known manner, for example as described in GB patent Nos. 2317475 and 2317542, compiles statistics on packets or randomly selected packets passing through the switch. A CPU interface 35 links the various blocks in switch module 32 to a central processor (not shown). A replication engine 36, accessed in a manner to be described later, operates to replicate a packet sent to it a controllable number of times. Receive data link block 37 is the functional means by which packets are directed to the transmit data link blocks 38 (if the frame is to be forwarded to a local port) and written into a respective FIFO 46. The receive data link block 37 may direct packets through interfaces 39 (corresponding to the respective interfaces 16 in FIG. 1) and frames may be received from other chips by way of interfaces 40 to the transmit data link blocks 38.

In the switch module as shown in FIG. 3, data frames coming in by way of ports, such as ports 15 in FIG. 1, proceed by way of the media interfaces 30 to the receive circuits 31. Typically they are built up into 128-bit words which are then written to the respective receive FIFO for the respective port. The receive FIFOs are constituted in on-chip synchronous SRAM As indicated previously, each port has its own block of SRAM for receive buffering, being 32 kilobytes in size organised as 2 k words each of 128 bits.

When a complete frame is written into the receive FIFO, the receive circuitry reads the first 56 bytes into registers in the corresponding RISC. The receive circuit then provides a request for an address look-up to the look-up engine for that port.

The look-up block 33 comprises a plurality of look-up engines 41, of which the first is denoted 41-1. Look-up block 33 also includes static random access memory space 42 organised as a trie search. Arbiter 43 arbitrates between requests for access to the trie search 42. Look-up block 33 also includes a post-processing block 44 of the kind previously mentioned. The forwarding database to which the look-up engines have access may be partly constituted by off-chip (external) memory.

When the look-up engine (e.g. engine 41-1) for a particular port has completed its look-up and the RISC (e.g. 32-1) acting on the header bytes of the same packet has finished its modifications, to be described later, the result is written into the receive link table 45 in the receive data link block 37. The receive link table makes a decision to link to the appropriate destination port after checking that there are no other links from a source port in this chip to that destination port. The receive link table may set up several links from the different source ports simultaneously. When it is the turn of a particular source port to forward the packet, the receive circuitry (e.g. 31-1) reads the remaining frame data from the receive FIFO When the receive circuitry has read the complete frame from the receive FIFO it indicates to the receive link table 37 that the link may be terminated.

At the transmit side (38) of the chip, data is recovered from the internal bus if the frame is being transmitted to a local port, and written into the FIFO 46. This memory may be constituted by on-chip SRAM. When the frame reaches the top of the FIFO the status word is examined. Any port whose respective bit is set in the 8-bit destination port bitmask must receive a copy of the packet. When a complete packet has been written into a particular transmit FIFO, the data is removed from SRAM and passed to the respective media interface for transmission onto the respective external link.

The foregoing is intended to set a context for an example of the present invention, which lies in the close linking of each network processor, constituted by a RISC, and the respective look-up engine, which otherwise operates in ordinary manner to obtain a destination port bitmask and acts to perform the post-processing operations which may need to modify the destination port bitmask to take into account a same port discard rule, VLAN membership rules, spanning tree rules, or trunking rules according to the requirements of the system. All these rules are known in the art. The same port discard rule essentially prevents the dispatch of a packet from the port by which it has been received VLAN membership logic is required when not all VLANs exist out on a port. For example, if a packet is to be broadcast on VLAN 1 but ports 4 and 5 have no connection to VLAN 1, then ports 4 and 5 will be knocked out of the port bitmask. Spanning tree logic may be required to modify the bitmask to prevent packets being directed around a closed loop in the network. Trunking logic may be required to modify the bitmask in the event that more than one port is a member of a trunk or set of parallel links from a switch to another switch entity. All these operations, which, as previously indicated are known in the art, generally require 'post-processing' operations on a destination port bitmask after the bitmask has been originally obtained.

However, as indicated, the present invention links the operation of a network processor to the look-up engine so that they may partially operate in parallel and the look-up process and post-processing process can be the subject of intervention by the network processor.

Figure 4:
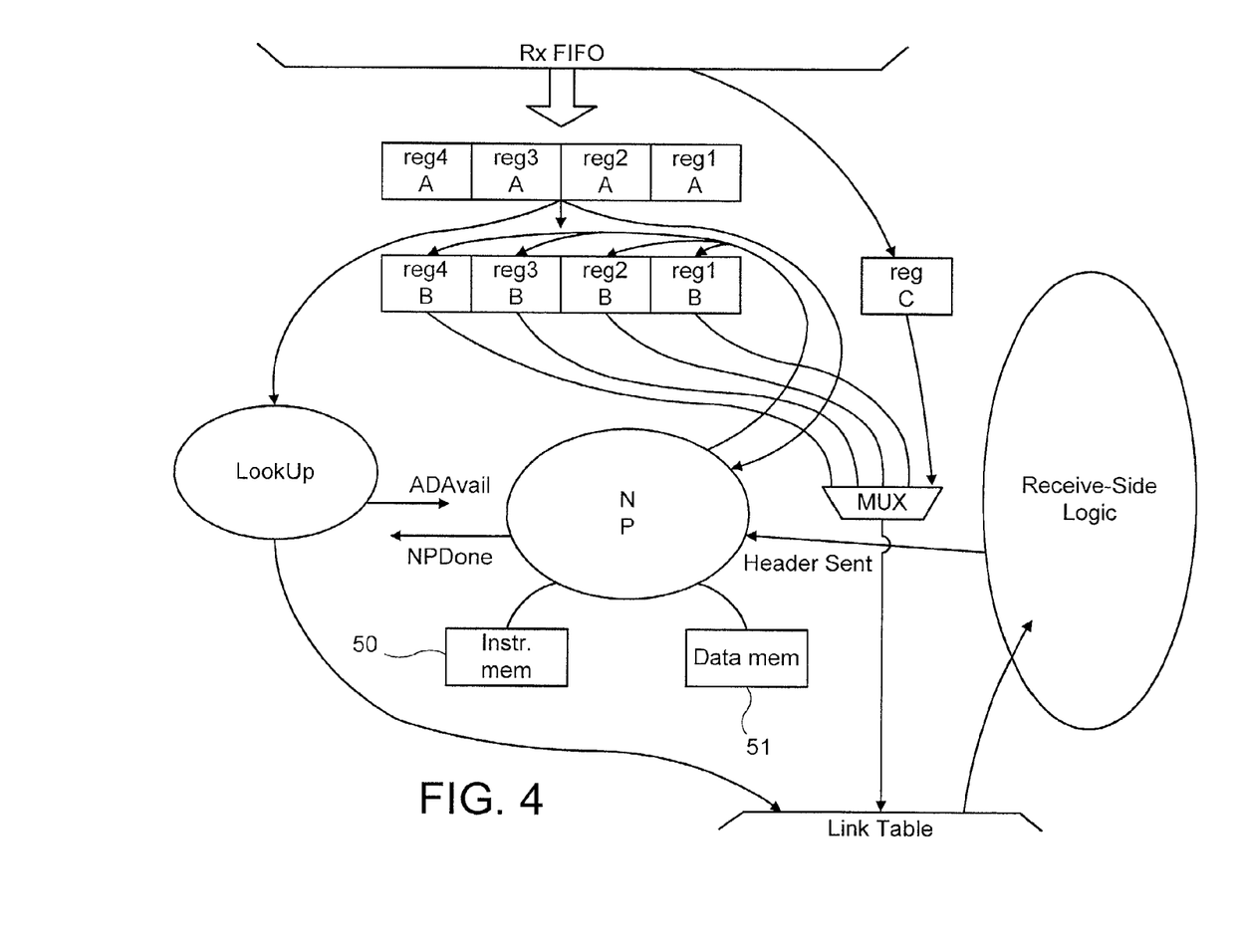
FIG. 4 is a schematic flow diagram illustrating the relationship between the look-up engine and the network processor.

FIG. 4 illustrates the functional linking of the network processor, the receive FIFOs, the look-up engine and the receive side logic. The full significance of FIG. 4 will become apparent from the description relating to the later Figures.

A packet header is read from the receive memory ((FIFO) into the 'A' bank of registers reg1A, reg2A etc. Typically each register contains a 128-bit network processor NP (which has an associated instruction memory 50 and data memory 51 and is constituted by the respective RISC in FIG. 3. At this point the look-up request is generated and the network processor starts looking at the packet. If the network processor wishes to change part of the packet (e.g. IP DA in the case of SLB, VLAN in the case of replication) it overwrites that field in the 'B' bank of registers reg1B, reg2B etc. These registers are the same size as the 'A' registers. The look-up engine can modify fields in the 'A' registers as a result of its search and post processing. When the look-up engine and the network processor have finished their modifications, the contents of the 'A' registers are pushed down into the 'B' bank of registers, except that the fields which the network processor has modified in the 'B' registers are preserved (i.e. the contents of the 'A' registers are prevented from overwriting these fields). Now the packet is ready to be transmitted. This is done by first sending the contents of the 'B' registers to the Rx Link table, which in turn sends it to the correct transmit port. When the Rx circuit (31-1) has read out the 'B' registers it then reads the rest of the packet from the FIFO through the 'C' register (regC).

The Receive link table interfaces to the receive side (31-1) via the look-up engine. As explained in FIG. 6 the network processor asserts a flag 'NPDone' (which may be a single bit) to the look-up engine when it has finished modifying the packet in the "B" registers (at this stage it will also have finished modifying the bitmask at any stage of the post-processing if necessary). The look-up engine then clocks out the bitmask to the receive link table along with a flag to indicate that the bitmask is valid. The receive circuit (31-1) then proceeds to read out the packet to the receive link-table as described above. So using the port bitmask information the receive link table knows which ports to link the packet to.

Figure 5A:
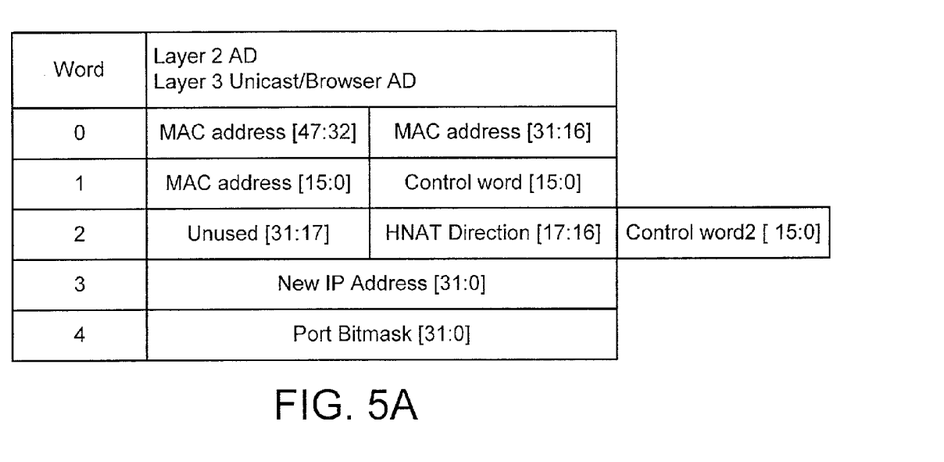
FIGS. 5A to 5C illustrate the format of associated data blocks in the look-up engine.
Figure 5B:
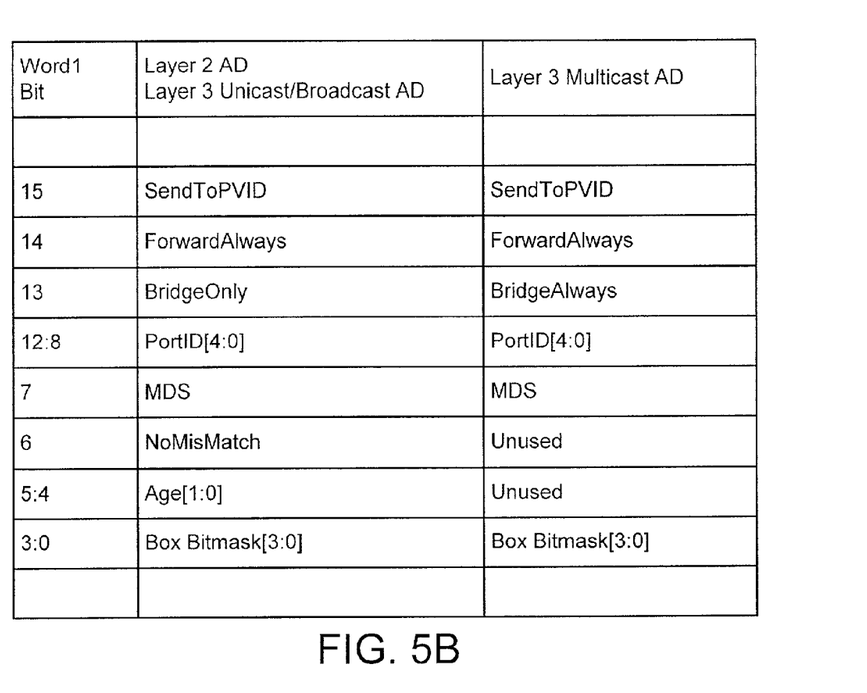
Figure 5C:
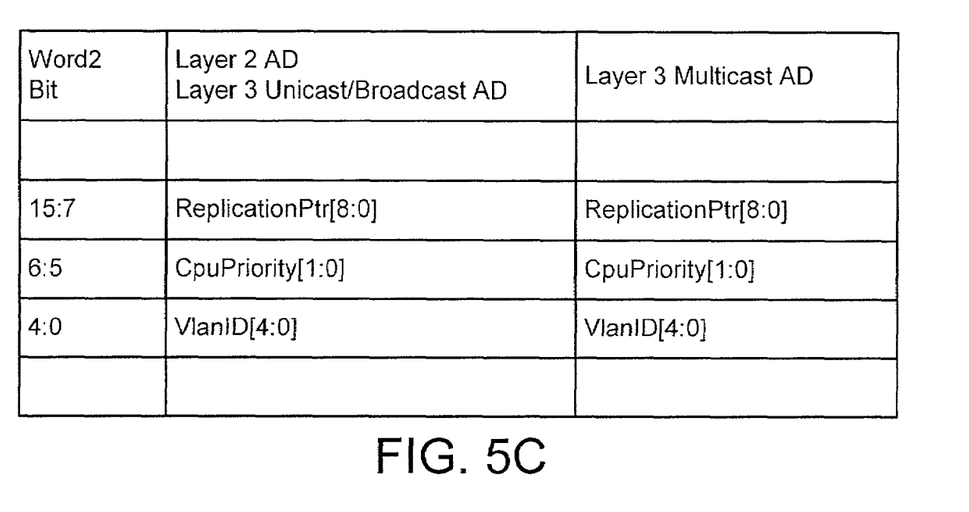

FIG. 5, divided into FIG. 5A, FIG. 5B and FIG. 5C, illustrates one example of the format of an 'associated data' block employed by the look-up engine. As previously mentioned, the look-up engine is preferably organised according to a trie search facility, and so the associated data block shows the format of the entry which is retrieved when the search is successful. In the present invention, a search may be made on the basis of either a layer 2 or a layer 3 look-up. The format of the associated data block is similar whether the look-up is made in respect of layer 2 or in respect of layer 3. However, some of the fields of the associated data block which are required for layer 2 address look-ups and IP (network) unicast or broadcast addresses are not used for network (IP) multicast packets. More particularly, an associated data block for a layer 3 multicast message cannot be shared with a layer 2 associated data entry.

Each associated data block comprises 160 bits, i.e. five longwords of 32 bits each. As shown in FIG. 5A, the first longword [0] is constituted by bits 47 to 16 of the MAC address. The second longword comprises the remaining bits [15:0] of the MAC address and a first control word, control word 1, of 16 bits.

In this example bits 31 to 17 of the third longword [2] are unused. Bits 17 and 16 relate to a half network address translation direction, to be described later and bits [15:0] of the third longword constitute control word 2. The fourth long word is constituted by the IP (network) address The fifth longword is the 32-bit bitmask which (subject to post processing and the actions of the network processor) determines the port or ports from which the packet or a replica thereof has to be forwarded.

FIG. 5B illustrates the fields of the first control word for the layer 2 or layer 3 unicast or broadcast associated data block and for a layer 3 multicast associated data block. The significance of some of the bits is not relevant to the present invention but is explained in our earlier co-pending GB patent application No. 0011239 1 filed May 10, 2000. More particularly, bits 15, 14 and 13 in control word 1 are, as described in the aforementioned patent application, relevant to a distributed multicast system wherein modification of media access control data in the packet depends on whether the packet is to be bridged (to the same VLAN) or routed and the modification (such as a change in source address) which may be appropriate in the case of a particular packet is indicated by flags, such as the SendtoPVID flag, but is actually delayed until the 'transmit side' of the switch. These bits and their significance will not be further described. Bits [12:8] of control word 1 are an identification of the port on which the packet was received. Bit 7 'MDS' is '0' for a unicast packet and '1' for a multicast or broadcast packet. Bit 6 'NoMisMatch' is a flag intended for use in accordance with the previously described distributed system. Bits [5:4] are 'ageing' bits set at the time the packet was received according to a recycling ageing system. Bits [3:0] constitute a box bitmask identifying the 'unit' or 'module'. Such a bitmask is useful in systems of stacked units, such as described for example in our earlier application No. 0010032 1 filed Apr. 26, 2000.

As is shown in FIG. 5B, bits 6, 5 and 4 are not used for layer 3 multicast associated data.

FIG. 5C shows the format of control word 2. This is similar for both types of addresses. Bits [15:7] comprise a replication pointer, bits [6:5] represent a priority for handling by the CPU and bits [4:0] represent the identity (VLAN ID) of the virtual local area network which is the source of the packet having the address which is being looked up.

Figure 6:
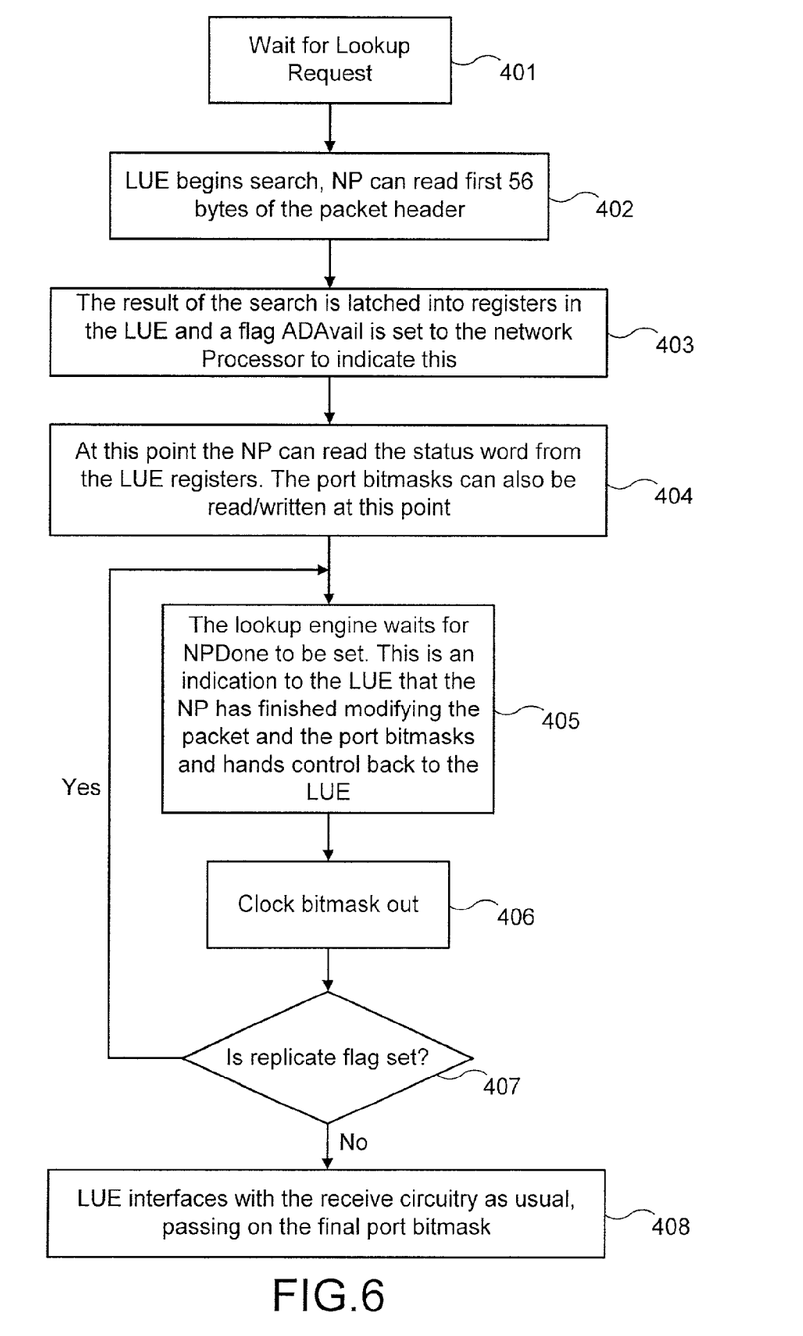
FIG. 6 is a flow diagram illustrating the relationship between a network processor and a look-up engine.

FIG. 6 illustrates the general manner in which the look-up engine and the network processor are linked as indicated in FIG. 4. At an initial stage 401, the system is waiting for a look-up request. The look-up engine begins the look-up (402). At that time the network processor (NP) can read the first 56 bytes of the packet header. These bytes include the address data and VLAN data. The result of the look-up is latched (403) in registers in the look-up engine and a flag ADAvail (c f FIG. 4) is sent to the network processor to indicate that the look-up has been completed. At this point the network processor can read the status word (stage 404) from the look-up engine's registers. The port bitmask can also be read or written over at this point.

The look-up engine waits for 'NPDone' to be asserted (stage 405) before performing any further operation in relation to the packet. This is an indication to the look-up engine that the network processor has finished modifying the packet and the port bitmasks and control is handed back to the look-up engine. The bitmask is clocked out, (stage 406) by the look-up engine. Depending on whether the replicate flag is set (stage 407), the look-up engine interfaces with the receive circuitry as usual, passing on the final port bitmask. If the replicate flag has been set the last three stages are repeated.

Figure 7:
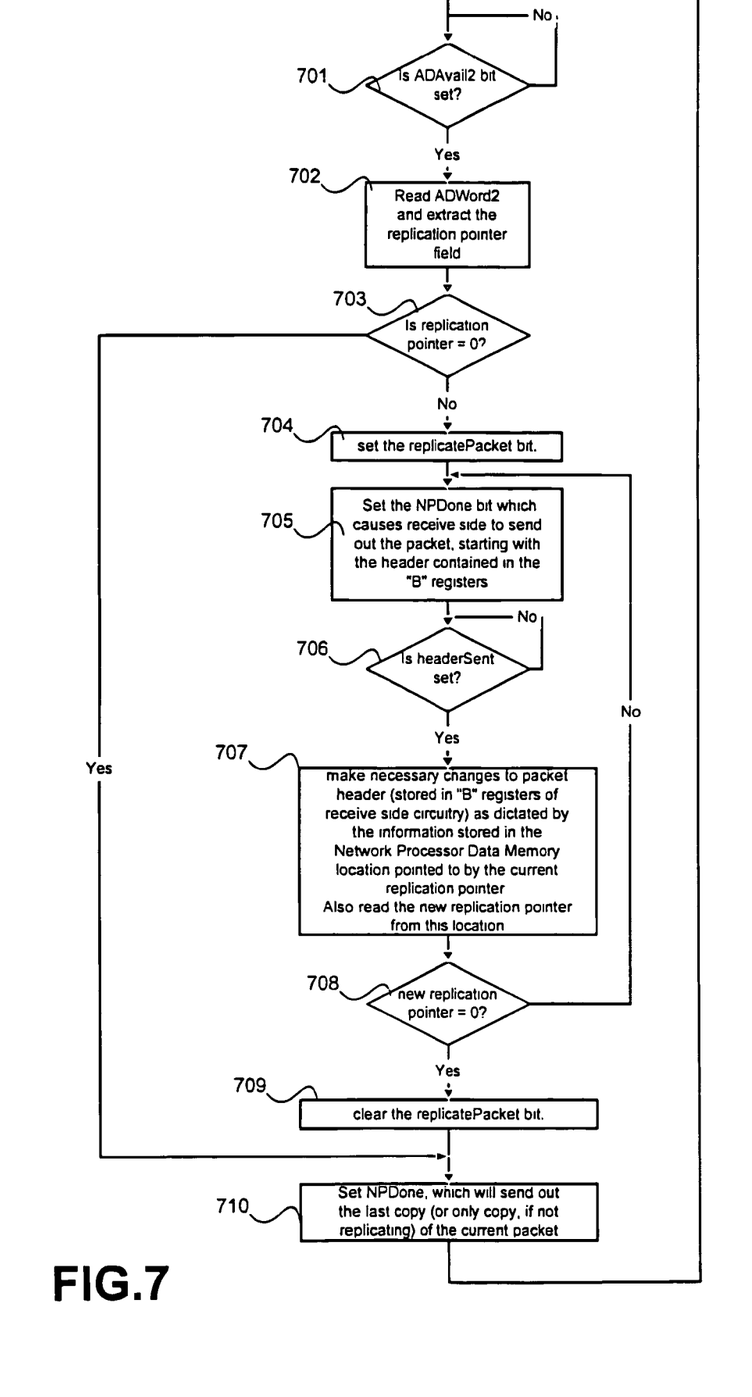
FIG. 7 is a flow diagram relating to packet replication.

FIG. 7 is a flow diagram illustrating the operation of the network processor, in relation to the look-up process, in the event that replication of a packet is required.

The look-up engine will determine (stage 701) whether a word containing a replication pointer field has become available. The engine will set a bit, in FIG. 7 called 'ADAvail2' and this bit will enable the network processor to read ADWord2 and extract the replication pointer field (stage 702).

If the replication pointer is zero, the current packet will not be replicated. If the pointer is non-zero, the value provides the address which the network processor should read to obtain the data which is used to change the header of the packet within the receive side. If a further replica needs to be sent, this location will also contain a new non-zero replication pointer. Only when a replication pointer of zero is encountered does the machine exit from the replication loop. Thus stage 703 is a test for whether the replication pointer is zero. If it is, then the flag 'NPDone' will be set (710), so as to send out the last copy (or only copy if there is no replication) of the current packet.

FIG. 7 deals with the more usual circumstance where the replication pointer is not zero. The network processor will set a replicate packet bit (stage 704) and also set the NPDone bit which causes the receive side to send out the packet, starting with the header contained in the 'B' registers. After a test to determine whether the header has been sent, the network processor will now make changes to the packet header which is stored in the B registers of the receive side circuitry. The changes are dictated by the network processor data memory location to which the current replication pointer points. The new replication pointer will be read from this location. If the new replication pointer is not zero, then the last three stages (705-707) are repeated. If the new replication pointer is equal to zero then the replicate packet bit will be cleared (stage 709) and the flag NPDone will be set.

When the network processor sets the NPDone flag, it will cause a pulse to be issued to the receive circuitry. This alerts the receive circuitry to the fact that the packet header has been correctly modified and can now be transmitted. For the first replica in a replication series no modification is required, so the flag NPDone can be set immediately, on the assumption that 'replicate packet' bit has also been set. If the receive side is still sending out an earlier replica the receive side will start sending out the new replica as soon as the current one is complete.

The signal 'headerSent' is provided by the receive side logic to the network processor to indicate that the contents of the B register have been read out for the current replica. While the receive side continues fetching the remainder of the packet from the FIFO and sends it onward via the C register the contents of the B register can now be modified for the next replica. In most cases all necessary changes will have been made by the network processor for the next replica before the receive side has sent out a current replica.

Finally, the setting of NPDone will cause the final, or only, copy of the packet to be sent. The receive side will then fetch a brand new packet from the FIFO and place its header in to the A registers. It is on this data that the look-up operation will operate. Once the look-up operation has been performed the new replication pointer will become available for this new packet once the bit ADAvail has been set.

Figure 8:
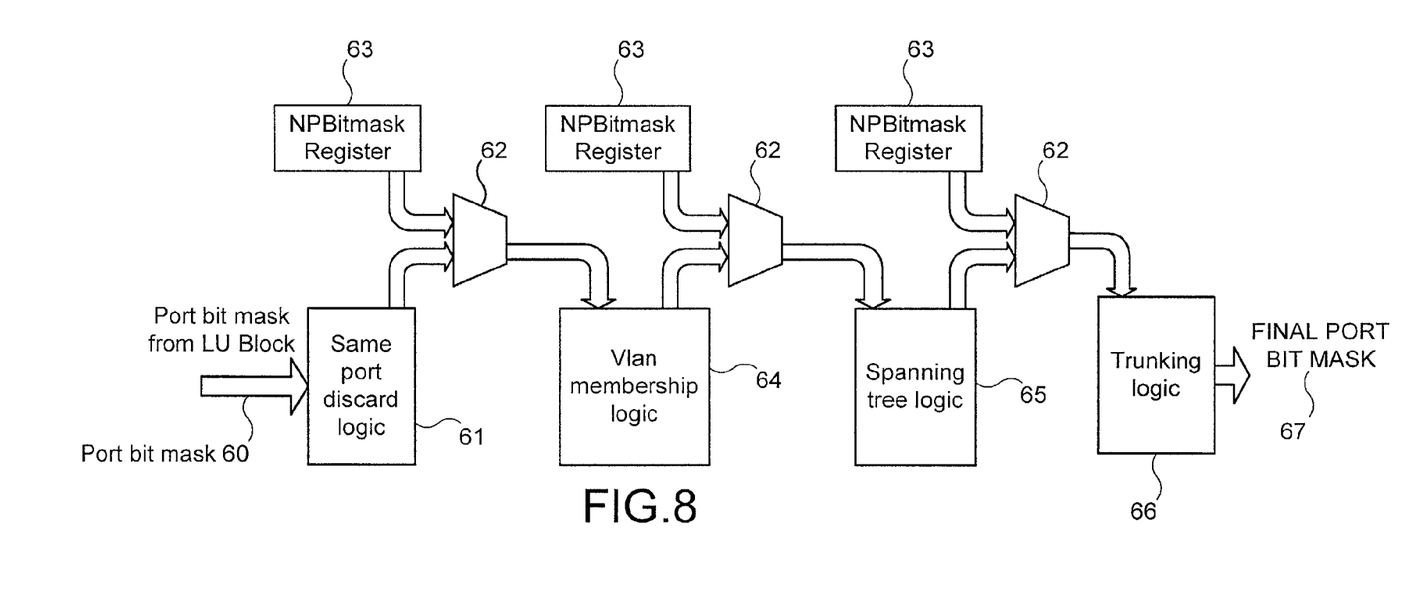
FIG. 8 is an explanatory diagram of the development of a port bitmask.

FIG. 8 is a block diagram of the post-processing logic in the look-up engine showing the manner in which the network processor intervenes. The network processor can read the bitmask as it is processed in the processing logic at any stage. FIG. 8 assumes that the port bitmask 60 comes from the look-up block and enters the 'same port' discard logic 61. The port bitmask which may be modified by that logic is coupled to a multiplexer 62 which combines the bitmask with an NP bitmask register 63. This register holds the bitmask generated as a result of the processing of the header by the network processor (the RISC core) Alternatively the port bitmask is passed to VLAN membership logic 64 and may thereafter be combined with the port bitmask held in NPBitmask Register 63 (repeated for convenience). Alternatively the NP port bitmask may be combined with the port bitmask from spanning tree logic 65. The multiplexer 62 and the register 63 are shown in multiple instances to indicate that the intervention of the network processor may occur after any stage of the post-processing logic. In this example the final port bitmask 67 modified by the trunking logic is passed to the receive circuitry.

Although the NPBitmask may be multiplexed or combined with the port bitmask at any stage of post processing, in reality it will be multiplexed in at only one stage for each packet. The value of the initial port bitmask (60) from the look-up engine will be latched. The final port bitmask (67) will not be clocked out until 'NPDone' has been provided by the network processor 'NPDone' will not be produced until the network processor has finished making all its modifications to the packet or port bitmask.

Figure 9:
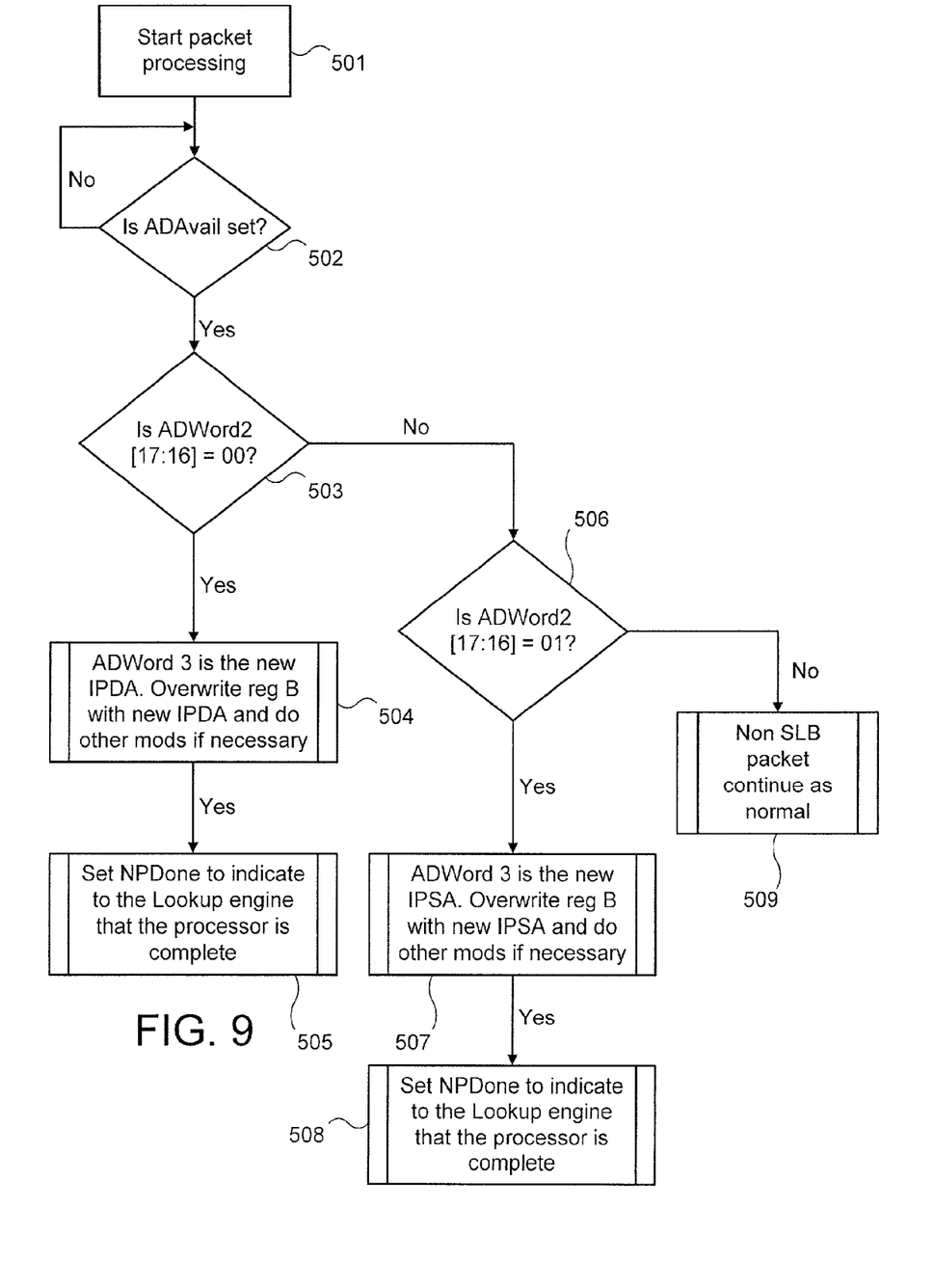
FIG. 9 is a flow diagram relating to server load balancing.

FIG. 9 is a flow diagram of the operation of the network processor for server load balancing. As is known, server load balancing is a technique wherein a multiplicity of servers are managed as a single entity. Packets are directed to one or other of the servers according to some appropriate algorithm (not relevant to the present invention). The forwarding of packets to a group of servers balanced in this way and the forwarding of packets received from those servers requires the alteration of a network (IP) destination address or source address depending on the direction. This is what is meant by half network address translation.

The present invention may be employed to facilitate server load balancing. The look-up performed by the look-up engine produces, as shown in FIG. 5A, an associated data block including the 2-bit HNAT direction field, bits 17 and 16 of the third word [word 2]. Particular values of these bits may be employed by the network processor to alter either the network [IP] destination address or the network source address as the case may be. The network processor will perform the modification by overwriting the relevant register B, as shown in FIG. 4.

FIG. 9 illustrates the process. From a start stage 501 one must first detect whether the ADAvail bit flag has been set, stage 502 If the bits ADWord2[17:16]=00, then the network processor will overwrite register B with the IP address defined by the fourth word [word 3] in the associated data block. Other modifications (such as for example re-computation of check sum) are performed if necessary. On completion of the overwriting and other modifications that may be necessary, the network processor sets 'NPDone' to indicate to the look-up engine that the process is complete.

If however ADWord2 (17:16)=01, then the IP address constituted by the last word of the associated data block is required for the new IP source address. The register will be overwritten with this new IP source address and other modifications made as necessary. Then the network processor sets NPDone to indicate to the look-up engine that the processor is complete.

In this scheme, if the value of the associated data word 2 bits 17 and 16 do not indicate that server load balancing is relevant, the packet is a non SLB packet and this is treated in the normal way, stage 509.

Figure 10A:
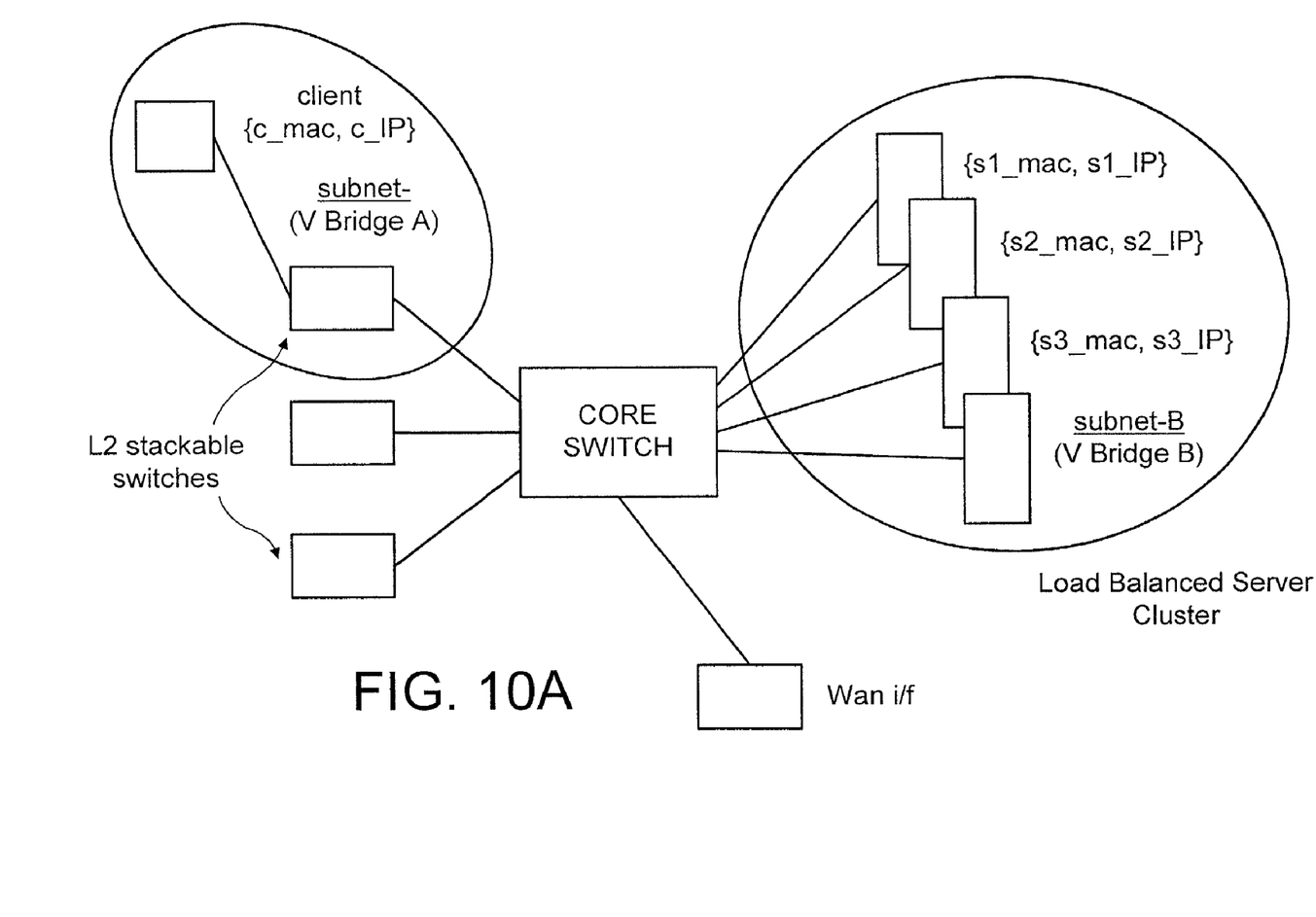
FIG. 10 is an illustration of server load balancing.

FIG. 10A is a drawing of a core switch with an associated client and a stack of layer 2 switches and also a group of servers. This cluster of servers is to be load balanced. For completeness the core switch is shown as having an interface to a wide area network.

Figure 10B:
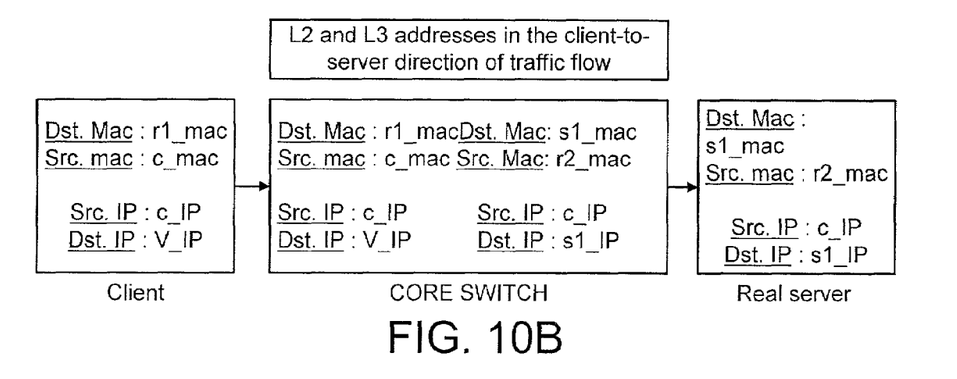
Figure 10C:
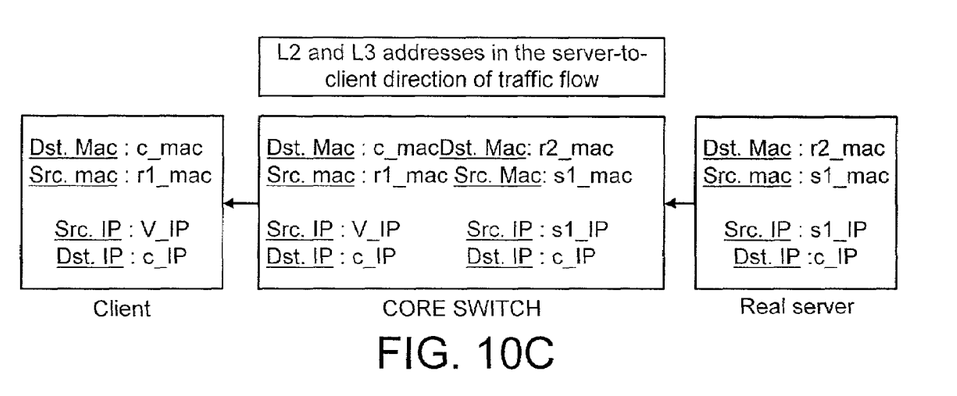

FIG. 10B illustrates the media access control addresses and the network addresses in a packet as it passes from the client through the core switch to the real server. FIG. 10C shows the MAC addresses and IP addresses of the packet as it passes from a real server to the client in the other direction of traffic flow.

It is conventional in these circumstances for the server cluster to be assigned a virtual IP address. This is the network destination address of the packet as it leaves the client and as it enters the core switch. Amongst other things the core switch has to change this virtual IP address into a 'real' address of one of the servers. This is the change from V_IP to s1_IP in FIG. 10B Likewise, in the reverse direction, a packet from, for example, the server having the source IP address s1_IP will require that source address to be changed to V_IP by the switch.

What is claimed is:

1. A network switch comprising:
    a look-up engine operative to retrieve a port bitmask in response to a header portion of a received packet and to forward the received packet only in response to receiving a modified port bitmask and a release signal corresponding to said received packet;
    a network processor operable to perform a processing function, in response to at least one of said received packet and said port bitmask, to generate the modified port bitmask, to provide said release signal corresponding to said received packet and to iteratively provide the modified port bitmask to the lookup engine.

2. The network switch according to claim 1 wherein each of said lookup engine and said network processor receive a first indication that the packet has been received.

3. The network switch according to claim 1 wherein said look-up engine provides for said network processor a second indication, said second indication indicating that said port bitmask has been obtained.

4. The network switch according to claim 1 wherein said network processor is operative, in response to said first indication, to execute said processing function and to provide to said look-up engine a third indication, said third indication indicating that said processing function has been executed.

5. The network switch according to claim 1 wherein said network processor performs the processing function in parallel with the retrieving by the lookup engine.

6. The network switch according to claim 4 wherein the lookup engine forward a plurality of copies of the received packet, each of the plurality of copies in response to one of a plurality of modified port bitmasks provided by the network processor.

7. The network switch according to claim 4, wherein the lookup engine retrieve a port bitmask for a next received packet only after receiving said third indication.

8. The network switch according to claim 4 wherein said third indication is said modified bitmask.

9. The network switch according to claim 6 wherein said third indication is sent based on a value of a replication pointer.

* * * * *